Figure 1:
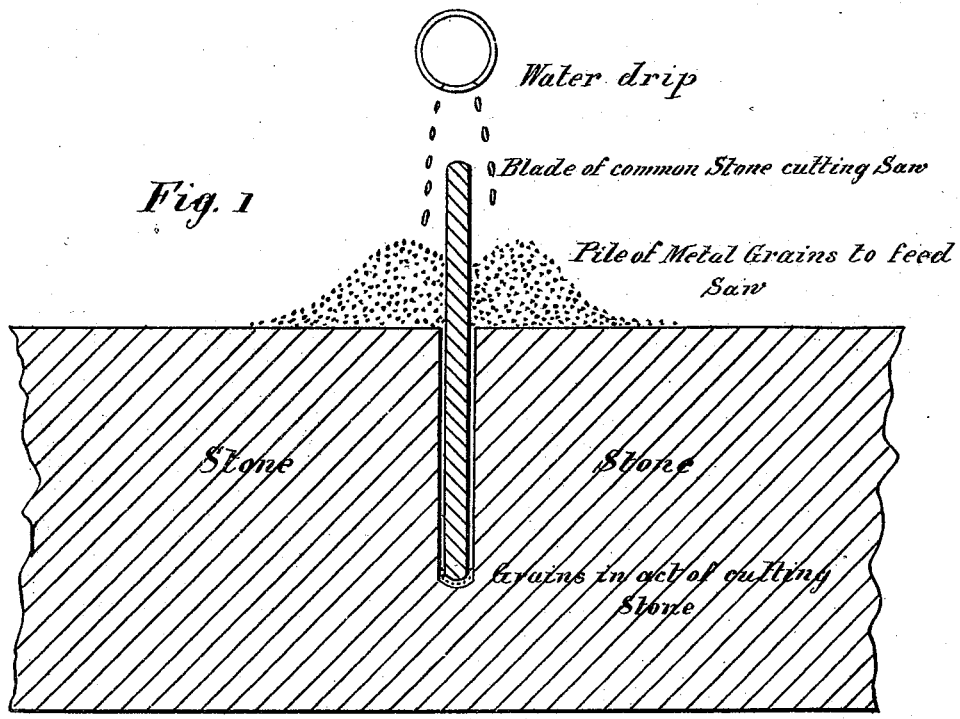
Figure 2:
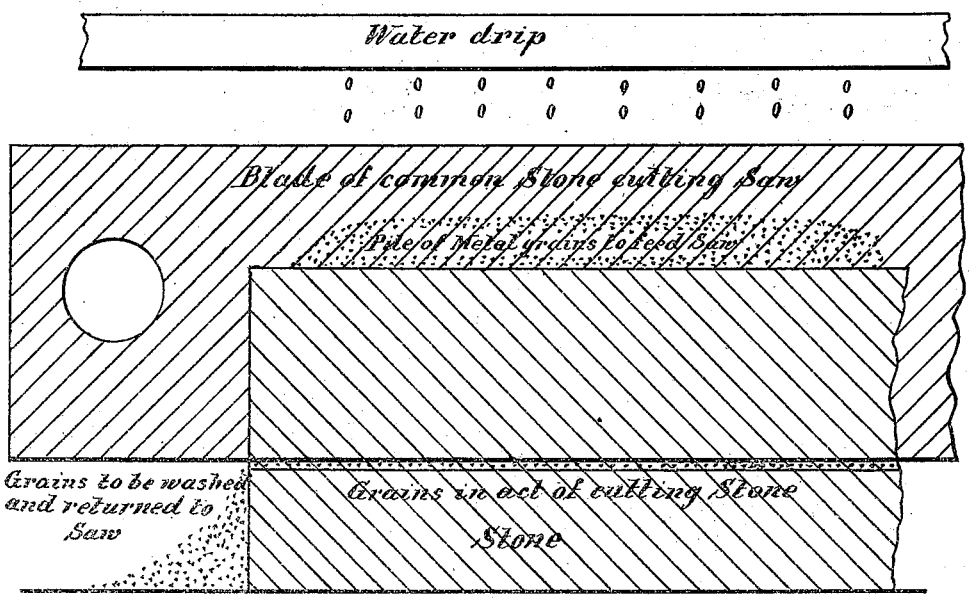

B. C. TILGHMAN.
Cutting Stone and other Hard Substances.

No. 133,501.  Patented Nov. 26, 1872.

Witnesses  Inventor
B. C. Tilghman.

UNITED STATES PATENT OFFICE.

BENJAMIN C. TILGHMAN, OF PHILADELPHIA, PENNSYLVANIA.

IMPROVEMENT IN CUTTING STONE AND OTHER HARD SUBSTANCES.

Specification forming part of Letters Patent No. 133,501, dated November 26, 1872.

*To all whom it may concern:*

Be it known that I, BENJAMIN C. TILGHMAN, of Philadelphia, Pennsylvania, have invented certain Improvements in Cutting Hard Substances, of which the following is a specification:

My invention consists in cutting, sawing, boring, and grinding stone, glass, pottery, metal, and similar hard or solid substances by means of grains or globules of tough and hard metal forcibly rubbed against them under pressure by a saw-blade, borer, tool, or rubber in a manner analogous to the known processes of sawing and grinding stone, glass, and other substances by means of sand or emery. The material for the metallic grains which I prefer to use in practice, because of its cheapness, is cast-iron, and I select those varieties which are known to engineers and metallurgists to possess the greatest toughness and hardness as compared with their price. By the term "toughness," as applied to the metallic grains in this specification, I mean the property of resisting blows, rubbing, or pressure without breaking or crumbling to powder, or the property the opposite of brittleness; and by the term "hardness" I mean the property of resisting blows, rubbing, or pressure without being flattened, indented, or changed in shape.

The advantage of the metallic grains or globules as a cutting or grinding material, as compared with sand or emery, arises chiefly from their greater toughness, which enables them to longer retain their original size and shape under a degree of rubbing pressure and friction which would rapidly crush sand or emery to fine powder.

The following is one method of carrying my invention into effect, taking, for example, the sawing of marble, sandstone, or granite with grains or globules of hard cast-iron, and the kind of saws commonly known and used for sawing stone.

The grains are to be applied to the saw in the same manner as the sand commonly used, and are fed into the saw-kerf with small streams of water in the same way, so that a constant supply of them will be washed down and will be caught and rubbed between the edge of the saw and the stone.

The grains which escape from the kerf are collected and thrown back again to feed the saw.

The supply of water should be sufficient to wash away the mud produced from the stone and metal, so that the clean grains can come into close contact with the clean stone.

The small pieces and powder of the worn and broken grains of metal may be separated from the mineral portion of the mud by known processes of washing, and may be sifted and reused for such grinding or polishing purposes as their size will suit, or they may be remelted.

Magnets may be used to help the saving and separation of the iron from the mineral powder in a way which is well understood.

If the water is kept alkaline by lime or other alkali, the iron grains will be less apt to rust and cement together.

The grains can be used with various forms of reciprocating, circular, crown, or band saws, or with any other suitable known kind of sawing, boring, or rubbing machinery.

In drilling holes in rocks with the metal grains and a rotary drill, I have sometimes used a tubular or hollow tool, like a crown-saw, which will make an annular cut leaving a central core to be afterward detached.

When boring a hole without a core, I use a solid tool pierced with a small hole, near but not at the center.

The grains can be supplied by means of a stream of water forcibly driven through the central hole, and the mud and metallic fragments escape with the water round the outside of the drill-tool. By thus forcibly transporting and feeding the supply of grains by means of a current of water, saw-cuts or bore-holes can be made to any distance and in any direction, upward, downward, or horizontal. I have made perforated tools or saw-blades for such purposes of two plates soldered together, and having a number of grooves on their meeting-faces, which grooves coincide when the plates are put together, so as to form a series of tubes or channels through the body of the tool, by which a supply of grains can be carried by streams of water to the surface to be cut. By thus operating horizontally or upward saw-cuts and bore-holes may be made in tunnels, mines, quarries, &c.

The known machinery used for the diamond drills and saws may be applied to working with the metallic grains.

In certain cases a forced current of air may be used instead of water to transport the supply of grains to the cutting-surface, and to remove the *débris*, and cool the tool.

I have observed that grains or globules of roundish or spheroidal shapes seem to operate mostly by rolling over and over, indenting grooves into the rubbing-tool, if made of softer metal, and crushing into powder the stone over which they roll, while grains of pointed, angular, or irregular shapes tend rather to embed themselves in one of the rubbing-surfaces and tear or scratch the other.

In cutting and grinding pulverized substances—stone or glass, for example—I think that roundish or spheroidal grains or shot give the best results in proportion to the power employed.

It is important for rapidity of cutting to keep a constant supply of fresh unbroken grains between the rubbing-surfaces, as when the grains become worn or broken much below their average original size, the small particles tend to escape the pressure.

To facilitate this supply and the washing away of the *débris* of stone and metal, I have found it useful, when the nature of the operation permits, to cause the tool to draw back from the work slightly and frequently, and to strike it again with a sliding blow, as is practiced in the ordinary process of sawing stone with sand.

I have sometimes used notches or cuts in the rubbing-surface of the tools, and grooves or corrugations in their sides to assist in feeding the grains.

The greater the speed and pressure of the rubbing, the faster will be the cutting; but as economy in the consumption of the grains is an object the pressure should be kept below that which will too rapidly break or crush them.

For general cutting and grinding purposes I have found grains or globules of about from one hundredth ($\frac{1}{100}$) to one-twentieth ($\frac{1}{20}$) of an inch diameter to give good practical results; but I do not mean to confine myself thereto, and I intend to use both smaller and larger sizes wherever suitable.

The size of grains or globules most suitable, in view of the economy of time, power, and expense, will vary according to the object desired and the material operated on, and can only be ascertained by comparative trials. As a general rule it may be stated that small grains produce smoother and more polished surfaces, narrower saw-kerfs, and sharper lines and edges, and operate on hard stones with less pressure, while large grains, at suitable speed and pressure, cut faster into soft stone, make a wide saw-kerf and leave a rougher surface. I recommend the operator to use grains of nearly uniform size in the same operation, and to commence upon any new kind of material with a small size of grain, and to change to larger sizes successively (but not mixing different sizes) until he finds the size which will cut the fastest while still producing the smoothness or polish of surface and other results which he desires. I have obtained fair average results in sawing stone with roundish grains of about one thirty-fifth ($\frac{1}{35}$) to one forty-fifth ($\frac{1}{45}$) of an inch diameter. For smoothing and polishing operations I use a series of grains, particles, or powders of gradually-increasing fineness up to the ultimate degree, as is practiced in working with sand and emery.

I have found wrought-iron to be a good material for the saws, drills, and other rubbing-tools, but where more convenient for the purpose intended I have also used cast-iron, copper, stone, glass, wood, leather, and the other materials commonly used in the arts for grinding and rubbing with sand and emery. A very hard, close-grained material, like chilled cast-iron or hardened steel, does not generally answer so well, as the grains tend to slip over it; whereas they ought to partly adhere to or indent themselves into the surface of the tool or rubber so as to get sufficient hold or resistance to enable them, while sinking into the stone, glass, &c., to roll over or scratch into it.

The cutting, boring, sawing, and rubbing tools can be made of any suitable size and shape so as to produce holes or plane or curved surfaces; or any kind of moldings or ornamental designs, and the proper rotary, reciprocating, or other movements can be given to the tools and to the articles operated on by suitable lathes, slide-rests, sawing, planing, boring, or rubbing machines, or other known kinds of machinery; and I do not mean to confine myself to or to claim in this patent any particular form or kind of tool or machine for operating with the metallic grains.

If desired, the adherence of iron grains to an iron tool may be increased by making the tool magnetic, by known means.

I have recommended cast-iron as the metal to be generally used for the grains, because I think it gives the requisite combination of toughness and hardness at a cheaper rate than any other; but I do not confine myself thereto; and, if desired, any other metals can be used which possess these essential properties in sufficient degree as compared with the material to be operated on.

I have used grains made of steel and of various mixtures, and alloys of iron and steel with other metals, some of which were tougher and harder than grains of cast-iron, but were also more expensive.

Grains of wrought-iron or brass may be used to cut marble and other stones of about the same hardness and friability.

There are various tough and hard metals and alloys known to metallurgists which might be used if their cost permitted.

In cutting metals by means of the metallic grains I have observed that metals of a granular and brittle texture, like cast-iron, are more rapidly cut than some softer and more tenacious metals. This observation applies in a general way to other substances, and the rapidity of their abrasion depends in a great degree upon their pulverizable and brittle nature. Cast-iron grains will saw and bore corundum.

Another method of applying the metallic grains as a cutting and grinding material is to make them adhere strongly together by any suitable cementing or soldering substance, and to mold them into rasps, grindstones, wheels, or rubbing or cutting tools of any desired form, or to cover such implements with a layer or coating of the grains, soldered, cemented, or otherwise fastened to their surface, as is practiced with the artificial grindstones and emery and corundum wheels and sand-paper used in the arts. I have sometimes used tin-solder for this purpose, making it take well upon the cleaned metallic surface of the grains, and then molding the mass into shape or spreading it upon the tinned surface of the metal rubbing-tools.

One method which I have used for forming cast-iron into grains is to pour the melted metal onto the surface of a saucer-shaped plate of cast-iron about thirty inches in diameter, revolving in a horizontal plane about nine hundred turns per minute. As the scattered drops of metal are whirled from the circumference they strike at a slight angle against another plate of iron of similar shape, but of larger diameter and inverted, placed concentrically over the revolving plate, which glances the globules downward into water which chills and hardens them. Finely-divided streams of water are applied so as to prevent the iron plates becoming too hot. By operating in a close box or chamber, the atmosphere of which has been deprived of its oxygen, the tendency of the drops of hot metal to burn may be prevented. The more rapid the rotation of the plate and the more fluid the metal the smaller will be the grains produced.

I have observed that a rapid glancing impact at a slight angle between the drops of melted metal and the surfaces of the plates tends to produce a larger proportion of roundish-shaped grains.

The grains are to be sifted into uniform sizes, and, if desired, those of roundish or spheroidal shapes may be separated from those of more irregular shapes by rolling them down inclined planes, as is practiced in making lead shot.

I have sometimes made the grains by scattering or atomizing a stream of melted iron by a jet of steam, and I have used grains made by cutting off short lengths of fine wires.

Any known process of hardening or tempering may be applied to the grains by which their toughness or hardness may be increased.

Various processes are known in the arts by which metals can be formed into small grains, globules, or shot, any convenient one of which may be used; and I do not mean to confine myself to or to claim in this patent any particular method of forming the metallic grains.

What I claim is—

1. The cutting, sawing, boring, and grinding of stone, glass, pottery, metal, and similar hard substances by grains or globules of iron or steel or other tough and hard metal forcibly rubbed against them under pressure, substantially as above described.

2. As a new article of manufacture, a cutting, grinding, or abrading material for stone, glass, pottery, metal, and similar hard substances, consisting of grains or globules of iron or steel or other tough and hard metal, substantially as above described.

July 20, 1872.

B. C. TILGHMAN.

Witnesses:
SAML. P. JONES, Jr.,
HENRY C. GLADING.